United States Patent [19]

Anderson

[11] Patent Number: 5,088,391
[45] Date of Patent: Feb. 18, 1992

[54] METHOD AND APPARATUS FOR COOKING FOOD WITH A MOVING BELT

[76] Inventor: Edward M. Anderson, 2620 E. Medicine Lake Blvd., Minneapolis, Minn. 55441

[21] Appl. No.: 436,491

[22] Filed: Nov. 14, 1989

[51] Int. Cl.5 .................. A23P 1/08; A21B 1/48; A23L 1/01
[52] U.S. Cl. .................. 99/423; 15/256.5; 99/327; 99/450.2
[58] Field of Search .................. 99/327, 335, 353, 355, 99/356, 423, 443 C, 450.1, 450.4, 450.2, 450.6, 450.7; 198/635, 185, 835, 836.4; 219/388, 385, 469; 15/256.5

[56] References Cited

U.S. PATENT DOCUMENTS

| | | | |
|---|---|---|---|
| 2,112,309 | 3/1938 | Santillan | 99/339 |
| 2,576,633 | 11/1951 | Naylor | 198/635 X |
| 2,583,471 | 1/1952 | Collis | 198/835 |
| 3,074,288 | 1/1963 | Newton | 198/635 X |
| 3,088,581 | 5/1963 | Rostal | 198/815 X |
| 3,202,260 | 8/1965 | Wolf | 198/635 X |
| 3,225,716 | 12/1965 | Krooss et al. | 99/423 |
| 3,256,803 | 6/1966 | Nelson | 99/349 |
| 3,264,974 | 8/1966 | Miller et al. | 99/423 |
| 3,371,595 | 3/1968 | Peters | 99/352 |
| 3,423,573 | 1/1969 | Richards et al. | 219/469 |
| 3,489,106 | 1/1970 | Lostanhen | 99/423 X |
| 3,659,517 | 5/1972 | Holen | |
| 3,861,291 | 1/1975 | Guzaski | 99/450.2 |
| 3,878,937 | 4/1975 | Glaser et al. | 198/835 X |
| 3,965,807 | 6/1976 | Baker | |
| 3,972,672 | 8/1976 | Castro | 99/353 X |
| 4,043,259 | 8/1977 | Sato | |
| 4,096,791 | 6/1978 | Weiss et al. | 99/423 X |
| 4,147,922 | 4/1979 | Naeser et al. | 219/388 X |
| 4,321,858 | 3/1982 | Williams | 99/423 X |
| 4,389,562 | 6/1983 | Chandior | |
| 4,583,451 | 4/1986 | Kanagy | 99/423 |
| 4,806,733 | 2/1989 | Stone et al. | 219/388 X |
| 4,882,175 | 11/1989 | Ream et al. | 99/450.2 X |
| 4,887,708 | 12/1989 | Brown et al. | 198/835 X |

Primary Examiner—Harvey C. Hornsby
Assistant Examiner—Scott J. Haugland
Attorney, Agent, or Firm—Hugh D. Jaeger

[57] ABSTRACT

A method and apparatus for cooking food products has first and second sections of thermally conductive moving belt that are pulled over crowned hot plates to cook food product atop of the belt sections. An improved structure of reduced cost keeps the belt sections running true and in direct conductive contact with the hot plates. The improved construction provides for easy disassembly and cleaning without tools. The machine has an improved food roller for making roll-ups, and an improved scraper structure and suspension for removing cooked food from the belt sections. The method and apparatus will make crepes, filled crepes, roll-ups, omelettes, french toast, pancakes, and other cooked foods both from pre-fabricated items and/or liquid batters, with or without fillings.

4 Claims, 9 Drawing Sheets

METHOD AND APPARATUS FOR COOKING FOOD WITH A MOVING BELT

BACKGROUND OF THE INVENTION

1. Field of the Invention

This invention pertains to an improved method and apparatus for cooking food products by the depositing of a liquid batter upon a movable thermally conductive belt atop of and in contact with a relatively fixed heating platen.

2. The Prior Art

In the prior art, separate or discrete methods and devices are provided for cooking the likes of pancakes, crepes, omelettes, french toast, cookies and other generally flat food products made from batters and liquid mixes.

The use of chain conveyors and flat metal grills is well known for food cooking and in the cooking of liquid batters.

There is no single machine that can make and cook pancakes, crapes, omelettes and so forth.

The machines which exist for making crepes are factory type machines and are large, expensive, complicated, and custom manufactured. Machines of this type are not available at a price level enabling economically effective development and use in a retailing situation.

An initial endeavor to devise a method and cooking machine using a thermally conductive movable belt has been made by Stephen Sieradzki of Haileah, Fla. and is the subject of his co-pending U.S. Ser. No. 408,752 filed on Sept. 19, 1989. Sieradzki found that it was difficult to achieve effective thermal condition from a fixed plate through a moving belt to food atop the belt. Sieradzki's solution is to apply a partial vacuum between the plate and the belt to enhance thermal transfer via conductivity. Sieradzki also devised a method and cooking machine with first and second belt sections wherein primary cooking is achieved on the first belt and final cooking and/or food forming is done on the second belt section. Tracking of the movable belt was also found difficult to control.

OBJECTS OF THE INVENTION

It is an object of this invention to provide an improved method and apparatus for cooking food on a movable thermally conductive belt.

It is an object of this invention to provide a new method and apparatus for providing effective heat transfer between a relatively fixed hot plate and a moving thermally conductive belt running on the plate.

It is an object of this invention to provide a new method and apparatus for forming and/or removing cooked food items on a cooking belt.

It is an object of this invention to simplify a belt type food cooking machine.

It is an object of this invention to provide an improved apparatus for dispensing liquid food product upon a moving cooking belt.

It is an object of this invention to provide improved tracking of a food cooking belt.

It is an object of this invention to provide a new hot plate for a belt type food cooking machine.

It is an object of this invention to provide a new sanitary roller for a belt type food cooking machine.

It is an object of this invention to provide a new electrically control system and method for a belt type food cooking machine.

It is an object of this invention to provide a new and improved scraper and scraper mechanism for removing cooked food from a movable food cooking belt.

It is an object of this invention to provide a new and improved construction of belt type food cooking machine that enables relatively easy assembly, operation, adjustment, disassembly, cleaning and re-assembly.

SUMMARY OF THE INVENTION

A food cooking machine has a thermally conductive belt, a crowned hot plate under the belt, a motor for pulling the belt over the crowned hot plate, and structure for pulling the belt tauntly over the crowned hot plate.

A food cooking machine has a thermally conductive belt, a motor for pulling the belt over a hot plate, structure for dispensing liquid batter upon the belt, a doctor blade above the belt, and a slip-fitted mold sheet resting on the belt upstream of the doctor blade.

A belt heating hot plate has a crowned upper surface upon which a thermally conductive food cooking belt will move, and a fulcrum having an axis generally parallel to an axis of the crown.

A food cooking machine has a thermally conductive food cooking belt, a motor to move the belt over a hot plate and an electric control having a cooking timer to control motionless periods of the belt, advancing of the belt in steps and parking positions of the belt.

A food cooking machine has a thermally conductive food cooking belt, a motor to pull the belt over a hot plate, and an improved scraper to remove cooked food from the belt.

A food cooking machine has a thermally conductive belt, a motor for pulling the belt over a hot plate, and an improved food roller for rolling up the cooked food product.

A food cooking machine has a thermally conductive flexible food cooking belt, a hot plate under the belt, rollers within the belt and upward facing bearing sockets and cradles for the rollers and hot plate.

A method of cooking food has the steps of placing food upon a thermally conductive belt, and pulling the belt with the food thereon over a crowned hot plate, and removing the cooked and solidified food.

DESCRIPTION OF THE PREFERRED EMBODIMENT

Figure 1:
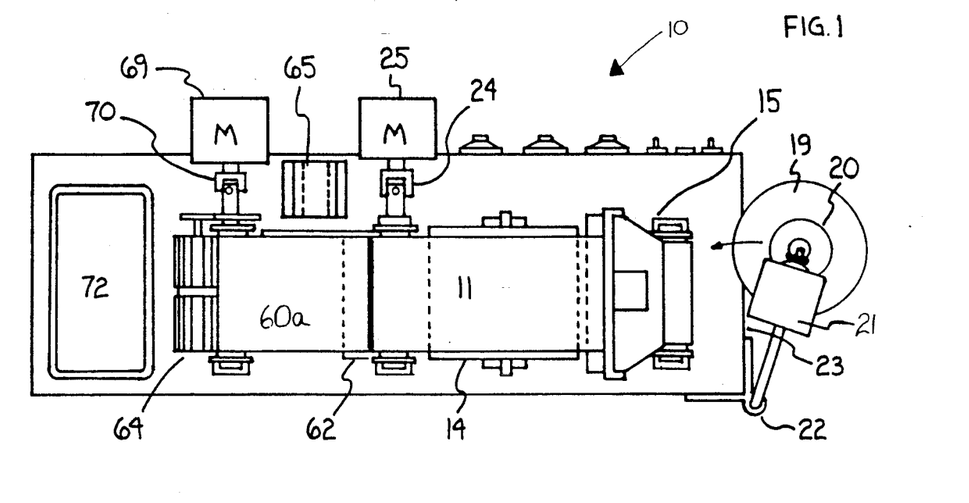
FIG. 1 is a top plan view of the preferred embodiment of a food cooking machine according to the present invention.

In accordance with the principles of the present invention, the preferred embodiment of a food cooking machine is shown in FIG. 1 and is generally indicated by the numeral 10. The machine 10 has a primary food cooking belt 11 which is flexible and which is movable. The belt 11 is fiberglass or other type of fiber embedded in a polytetrefluoroethylene such as that designated by the trademark TEFLON. The belt 11 is flexible, thermally conductive, and is about 0.003 inch (0.075–0.01 mm) thick. The belt 11 is looped over a drive roller 12 and a driver or idler roller 13. Under the upward facing outer cooking surface of the belt 11 is an electrically heated hot plate 14 which is immediately adjacent the drive roller 12. A loading station generally indicated by the numeral 15 is positioned between the hot plate 14 and the driver roller 13. The rollers 12, 13 both rotate counter clockwise as viewed in FIG. 1. The belt 11 is held taunt by a tensioner 16 biased about a tensioner fulcrum shaft 17 preferably by a weight 18. Atop the loading station 15 is a batter hopper 19 having a normally closed valve 20 and a dispensing motor and valve drive 21 for selectively dispensing units of batter or other liquid food product onto the belt 11. The hopper 19 is pivotally mounted in a journal 22 affixed to the machine base 23, and the hopper 19 will swing into and out of upright registry with the loading station. The drive roller 12 is connected by a quick disconnect slip joint 24 to a motor and gearbox unit 25. A scraper 26 is provided to scrape cooked and solidified food product off of the belt 11.

The loading station is best shown in FIGS. 3–6 and includes a planar loading support 27 underneath the belt 11. The loading support 27 rests upon a plurality of pins 28 mounted in the frame 29. The belt 11 runs upon and is supported by the loading support 27 which is positioned in between the hot plate 14 and the driver roller 13. A top of the belt 11 and the loading support 27 is an inverted weir or doctor blade 30 that is movably supported from pivot pins 31 in the loading support 27. The doctor blade 30 is mounted to a bracket 32 which has resilient ears 33 that snap on and off of the pivot pins 31 for quick and easy removal or installation. The doctor blade has a rounded edge 34 and a sharp edge 35, and the blade 30 may be fastened in four different configurations with respect to the belt 11. The bracket 32 has a pair of height adjustors 36 which abut against the loading support 27 and enable setting of an adjustable gap between the doctor blade 30 and the belt 11. This gap determines the thickness of the liquid food on the belt 11. The doctor blade 30 is at least as wide as the width of the belt 11 and the loading support 27 is wider than the belt 11. Upstream of the doctor blade 30 is a mold sheet 37 which is preferrably a fexible and resilient sheet of silicone rubber that is in the range of 3/16 to 3/8 inch (4 to 10 mm) thick. The mold sheet 37 has a batter or food pocket 41 defined by pocket sides 38 and an upstream face 39 to confine dispensed liquid food atop the belt 11. A downstream face 40 on each side of the pocket 41 bears against the doctor blade 30. The mold sheet 37 is not fastened to the belt 11 or the loading support 27, but is slip-fitted within the bracket 32 and has a pair of notches 42 that slip within the bracket ears 33 and a tapered nose 43 that extends up on to the driver roller 13. A plurality of mold sheets 37 will be provided with each machine 10 and each mold sheet will have a different pocket 41 for a particular purpose or food item. The width between the sides 38 and 38A determines the width of the food upon the belt 11, the height of the doctor blade 30 determines the thickness of the food on the belt 11, and the volume of the pocket 41 determines a maximum unit of liquid food that can be dispensed upon the belt 11.

Figure 7:
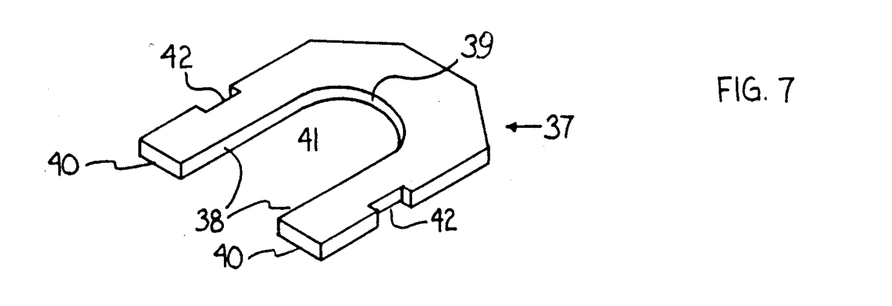
FIG. 7 is a perspective view of the batter mold in the structure of FIG. 3.

FIG. 7 shows a removed and discrete mold sheet 37. The exterior profiles will be identical, but the pocket geometry and volume as well as the thickness of the mold sheet 37 can be easily varied to enable the machine 10 to make many different foods, easily and economically. The mold sheet 37 is also discretely cleanable.

Figure 8:
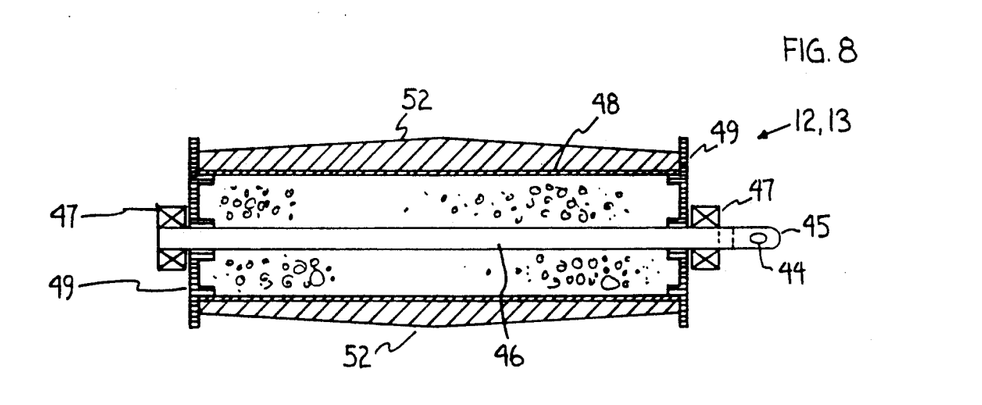
FIG. 8 is a cross-sectional view through the belt rollers in the structure of FIG. 1.

FIG. 8 shows the rollers 12, 13 which differ only by virtue of a drive pin 44 and nose 45 on the drive roller 12. Each roller 12, 13 is provided with a through shaft 46. On each end of the shaft 46 is a sealed bearing 47. About the shaft 46 is a metal tube 48 held in place by a pair of end caps 49. Within the tube 48 is dry sand ballast 50. The end caps 49 are hermetically sealed to the shaft 14 and tube 48. About the tube 48 is a ⅛ inch thick (3 mm) silicone rubber sleeve 51 that has been helically wound on and adhesive fastened to the tube 48. The sleeve has then been ground to have a centered barrel crown 52 of 0.050 inch (1.25 mm) as measured diametrically, for causing the belt 11 to track on the rollers 12, 13.

Figure 9:
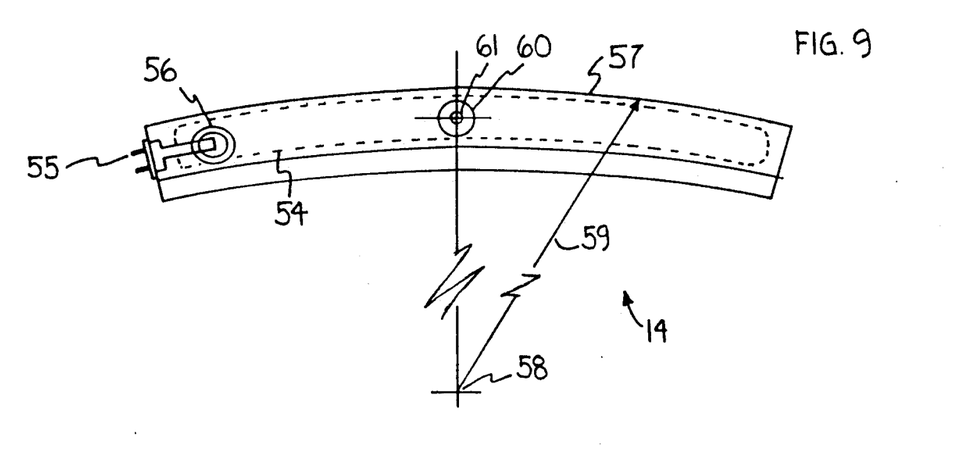
FIG. 9 is a side elevational detail view of the heater platen in the machine of FIG. 1.

FIG. 9 shows the hot plate 14 which is a metal plate 53 having an electrical heating element 54, a wiring terminal 55 and an indicator light 56 wired in parallel with the heating element 54. An important feature of the hot plate 14 is the convex and smooth upper crown surface 57. The convex crown surface 57 is parallel to a focus axis 58. A preferred radius 59 for the convex crown surface is six feet (1.8 m) and is continuous over the length of the hot plate 14. The hot plate 14 has fulcrum shaft (or socket) 60 that extends outward of both sides of the hot plate 14 and which has an axis 61 which is parallel to the focus axis 58. The fulcrum 60 is centered on the length of the hot plate 14. The hot plate 14 is preferably cast aluminum and the heater element 54 is preferably embedded. A layer of thermal insulation may be provided on the bottom of the hot plate 14 to improve thermal efficiency of the machine 10.

Figure 2:
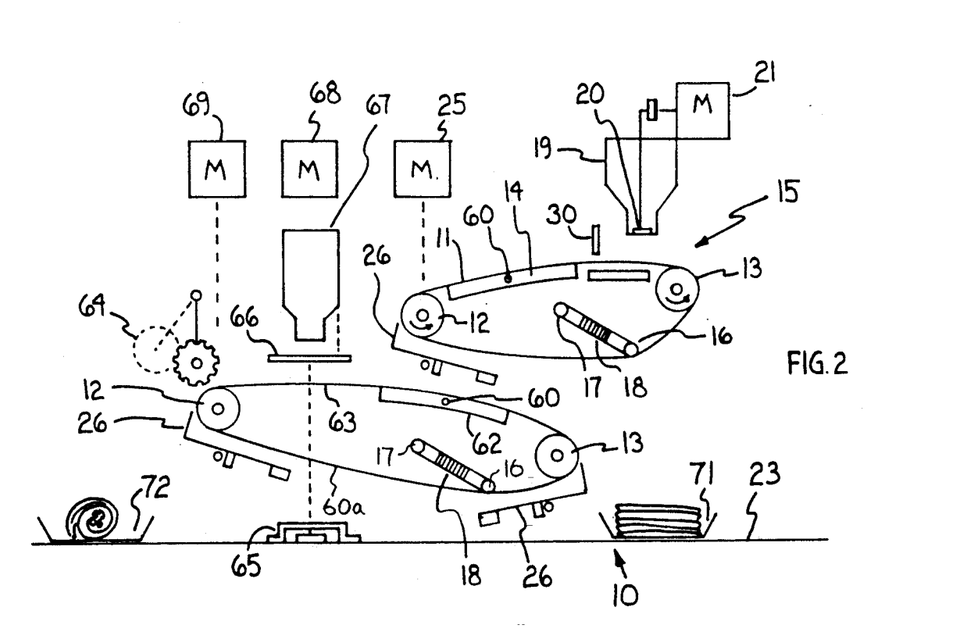
FIG. 2 is a side elevational schematic view of the machine of FIG. 1.
Figure 3:
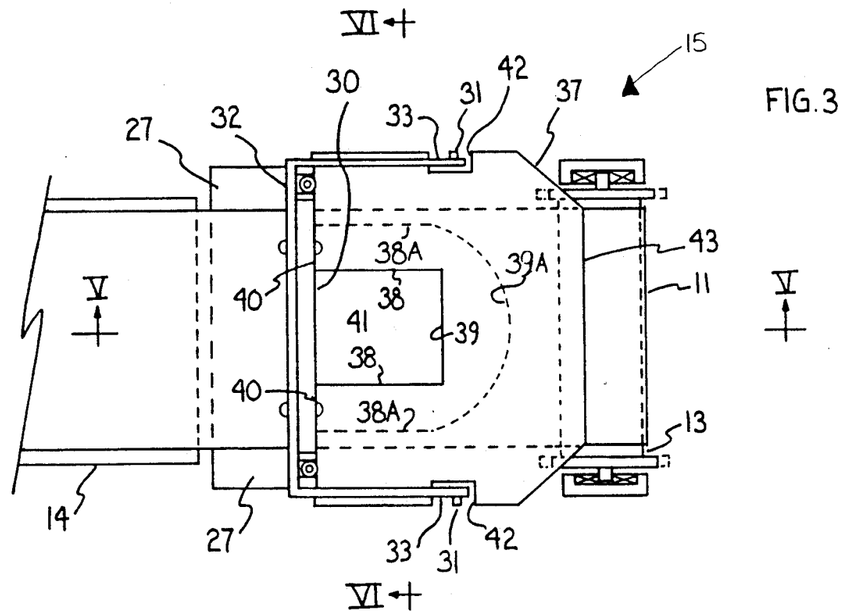
FIG. 3 is a top plan view of the loading section of the machine of FIG. 1.
Figure 4:
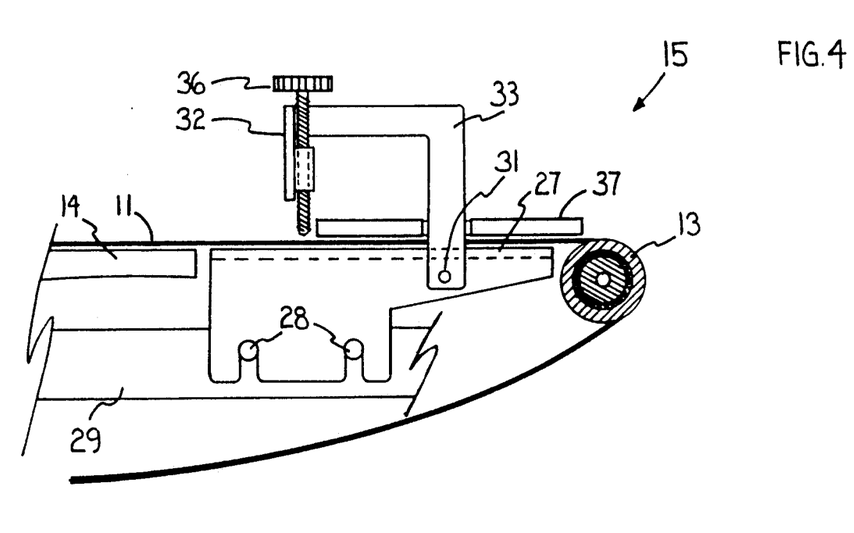
FIG. 4 is a side elevational view of the structure of FIG. 3.
Figure 5:
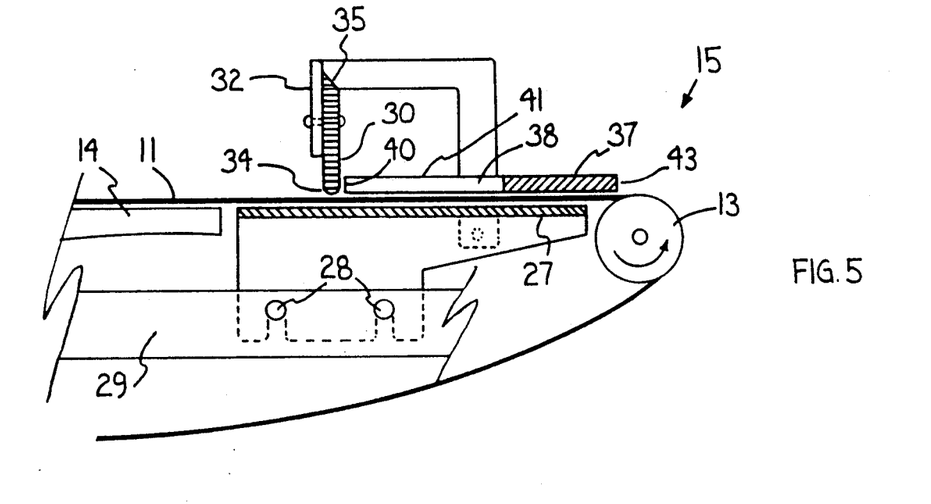
FIG. 5 is a side elevational view through lines V—V of FIG. 3.
Figure 6:
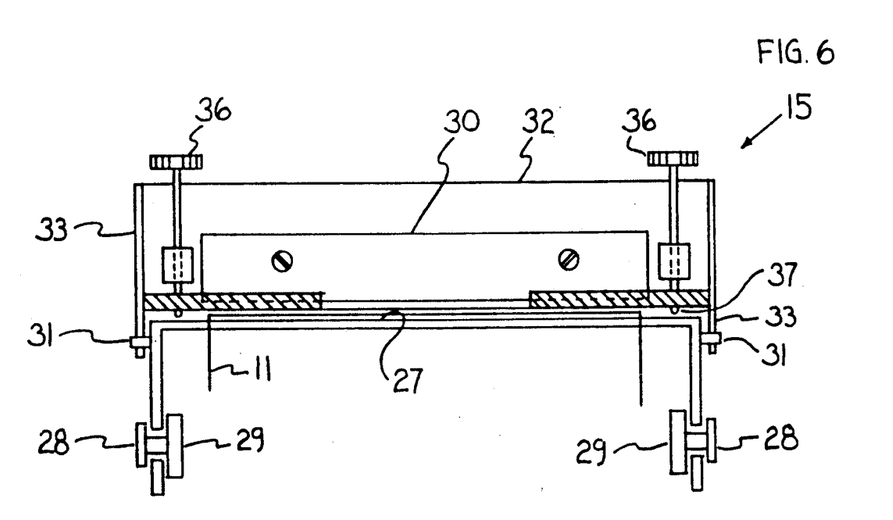
FIG. 6 is an end elevational view through lines VI—VI of FIG. 3.

Referring back to FIGS. 1 and 2, the machine 10 is also provided with a second belt 60A which is essentially identical to the first belt 11. The second belt is likewise on a drive roller 12 and driver roller 13 and has a second hot plate 62. The hot plates 14, 62 are identical to each other. An identical tensioner structure 16, 17, 18 is provided for the second belt 61 and a scraper 26 is provided at each roller 12, 13. The second hot plate 62 is positioned under the first drive roller 12. The fulcrum 60 of the second hot plate 62 is positioned under the first or primary belt 11. A portion of the second hot plate 62 extend outward of the first belt 11 (i.e. to the left of upper roller 12 and scraper 26 as shown in FIG. 2). In the second belt 61, there is an unheated length 63 beyond the second hot plate 62.

At the drive roller 12 is a food roller mechanism generally indicated by the numeral 64 for rolling the cooked food into a roll-up. On the base 23 is a bracket 65 under the unheated belt section 63 for support of a work table 66 or a filling dispenser 67 with a discrete motor 68. A separate and discrete motor 69 is connected by a quick disconnect slip coupling 70. The second belt motor 69 is either a two directional motor or is two motors, one of which gives a CW output and the other of which gives a CCW output. With a CW output from motor 69 the machine 10 produces a food product that is cooked from both sides and which is deposited into a tray 71 off of a second roller 13. Examples of a food product cooked on both sides are pancakes, french toast, omelettes, tortillas and so forth. When the motor 69 has a CCW output, the food product is cooked only from one side and is deposited into a tray 72 below the food roller 64.

Figure 10:
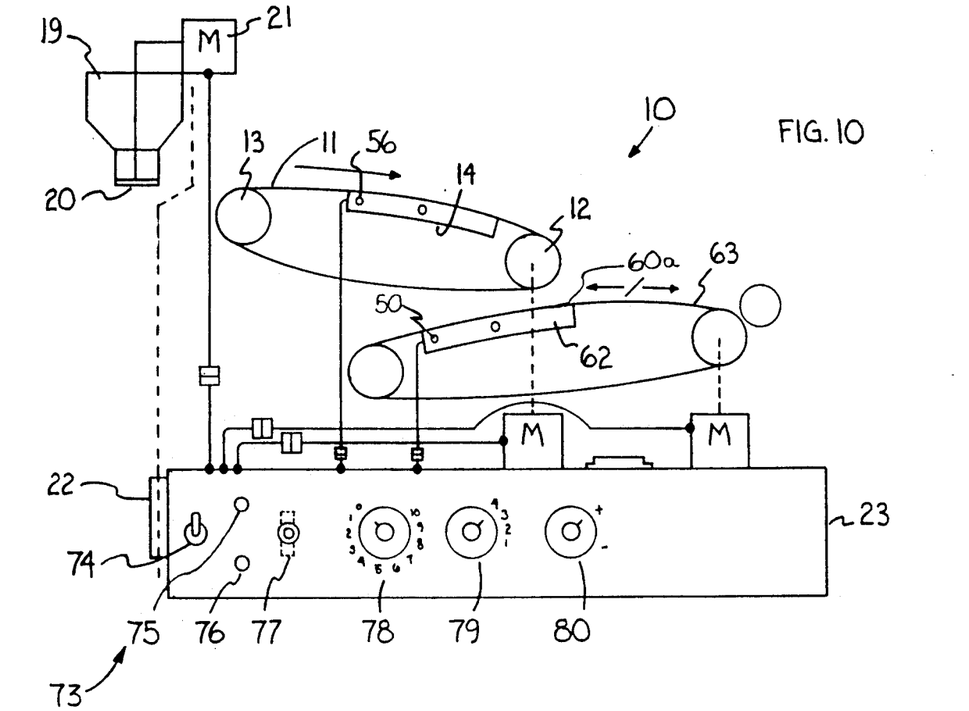
FIG. 10 is a side elevational view of the operator's side of the machine of FIG. 1, showing the electrical machine controls.
Figure 11:
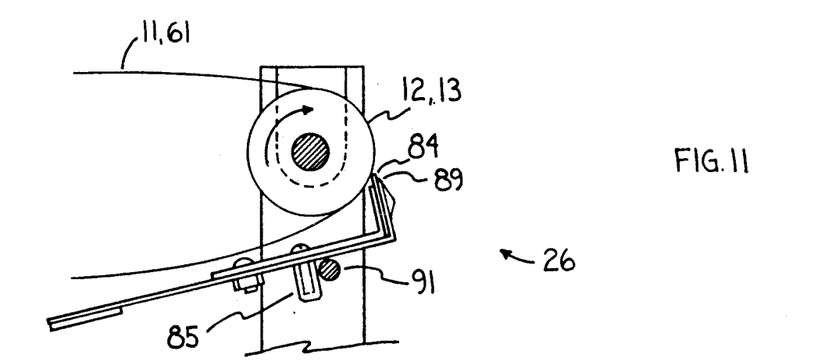
FIG. 11 is a side elevational view of the belt scrapers in the machine of FIG. 1.
Figure 12:
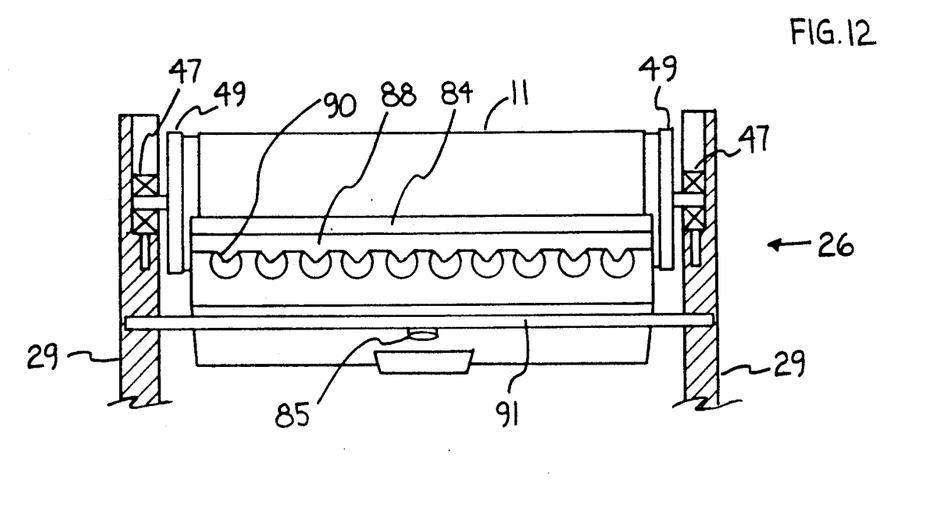
FIG. 12 is an end elevational view of the structure of FIG. 11.

FIG. 10 illustrates the electronic control 73 for the machine 10. On the left is a master on-off switch 74. Next is an upper heater indicator light 75 to indicate the upper hot plate 14 is on, a lower heater indicator light 76 to indicate the lower hot plate 62 is on, a three position heater control switch 77 that is normally off, has an upper position energizing the primary hot plate 14 only at 2000 watts, and has a lower position energizing both hot plates 14, 62 at 1000 watts each or 2000 watts total. The first dial is an adjustable cooking time control 78 that controls the amount of time that the belts 11 and 60a stop. If control 78 is set on "0", the belts 11 and 60a will move continuously and will not stop. If the control is set at "2" the belts 11 and 60a will stop 2 seconds, if set at "8" the belts 11 and 60a will stop 8 seconds and so on. The cooking time determines the quantity of time that the food is disposed directly atop the hot plate 14, 62. The next control is a distance traveled or stop frequency control 79 that controls the distance the belts 11 and 60a move each motion or travel cycle. Specifically, if you designate a point on the belt 11 and dispense food on it, the point with the food thereon can be stopped above the hot plate 14 one time if the food is of large area, two times, three times or even four times if the food item is small and thick. The next control is a vernier control 80 to control heat travel to within plus or minus 1/16 inch (1.5 mm) in a cycle of travel.

In the use of the control 73 and the machine 10 and in the practice of the method of this invention, the control 73 provides a starting pulse signal to the dispenser motor 21 while the belts 11 and 60a are stationary. The hopper 19 then takes 2-½ seconds to go through a dispense cycle to deposit one unit of liquid food in the pocket 41. Upon completion of the dispensing, the belt 11 begins to move under control of the frequency control 79. When the food is brought above the hot plate 14, the belt 11 stops and is kept motionless for a time period determined by the cooking times control 78. The belts 11 and 60a then start again and repeat.

It will be appreciated that if the machine 10 is being used for making french toast or other prefabricated food, i.e. potato patties, the dispenser 19, 20, 21, doctor blade 30 and mold sheet 37 will not be used.

For prefabricated foods the machine 10 may be manually loaded, or loaded with a material handling device.

Figure 13:
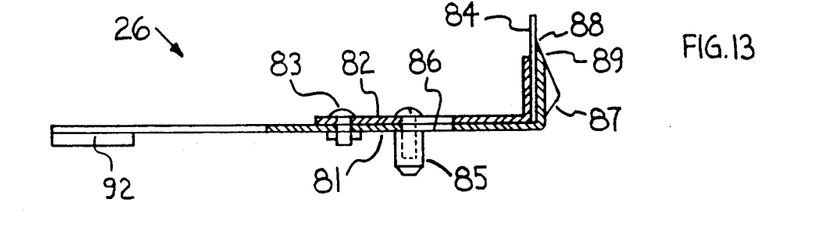
FIG. 13 is a side elevational detail of the scraper of FIG. 11.
Figure 14:
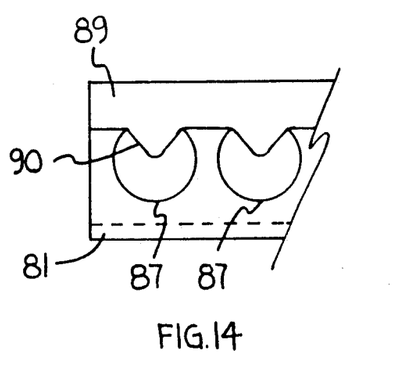
FIG. 14 is an end elevational detail of the scraper of FIG. 13.
Figure 15:
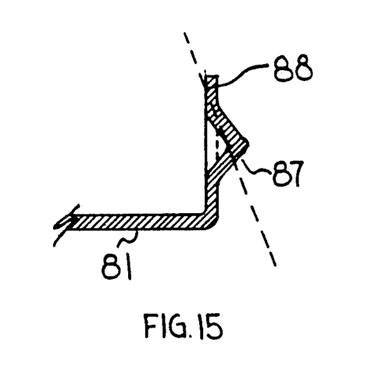
FIG. 15 is a side elevational detail to show how the scraper of FIG. 13 is devised.
Figure 16:
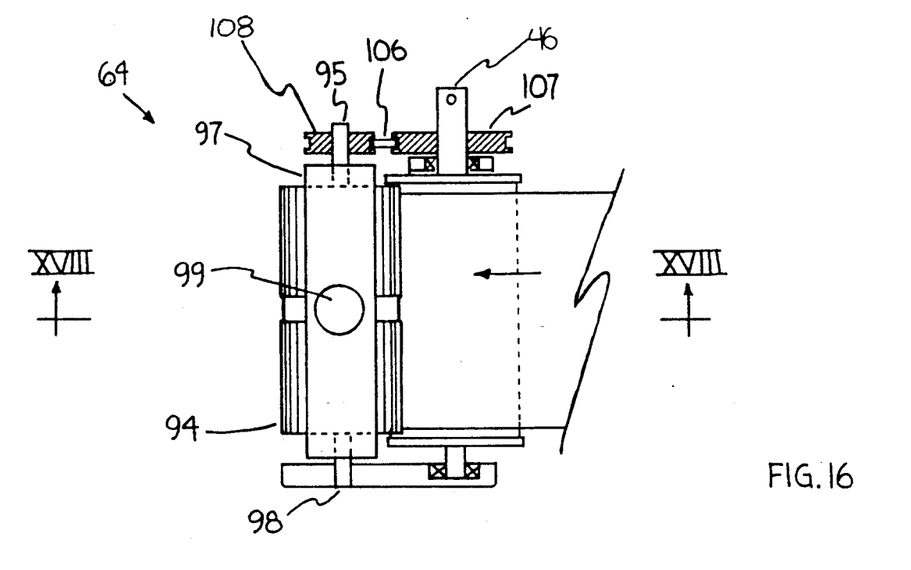
FIG. 16 is a top plan detail view of the rolling structure in the machine of FIG. 1.
Figure 17:
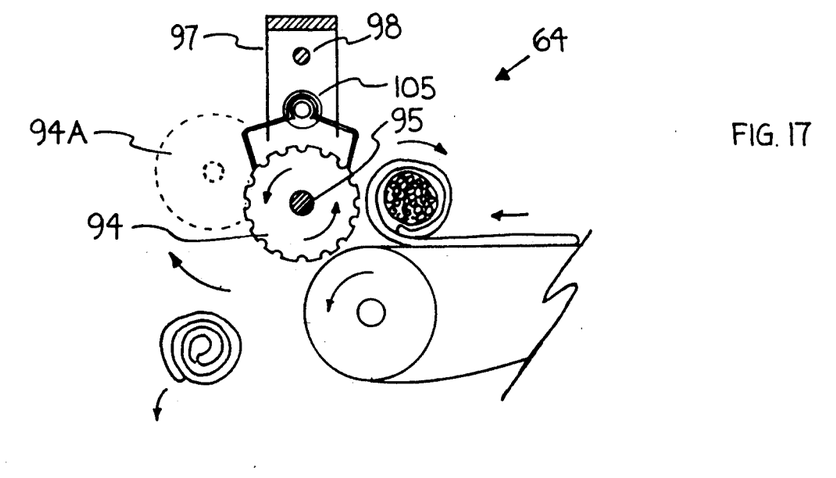
FIG. 17 is a side elevational view of the structure of FIG. 16.
Figure 18:
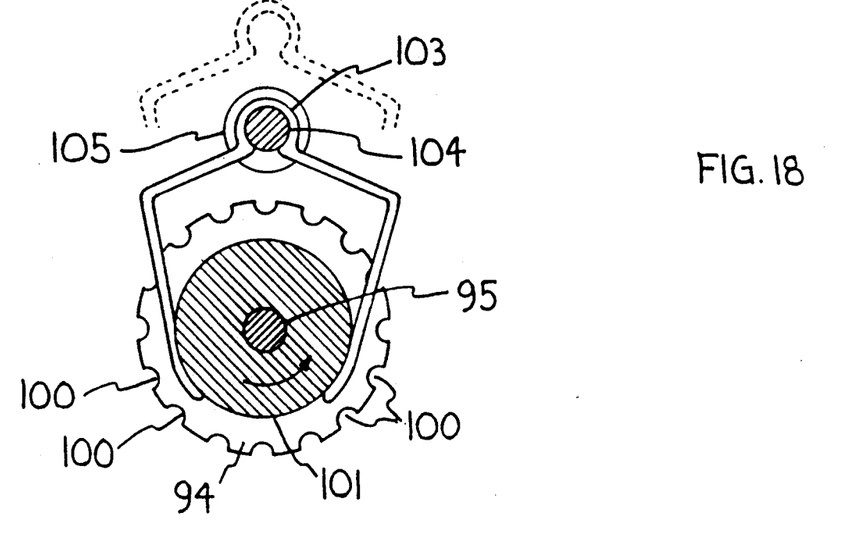
FIG. 18 is a further side elevational view in section through lines XVIII—XVIII of FIG. 16.
Figure 19:
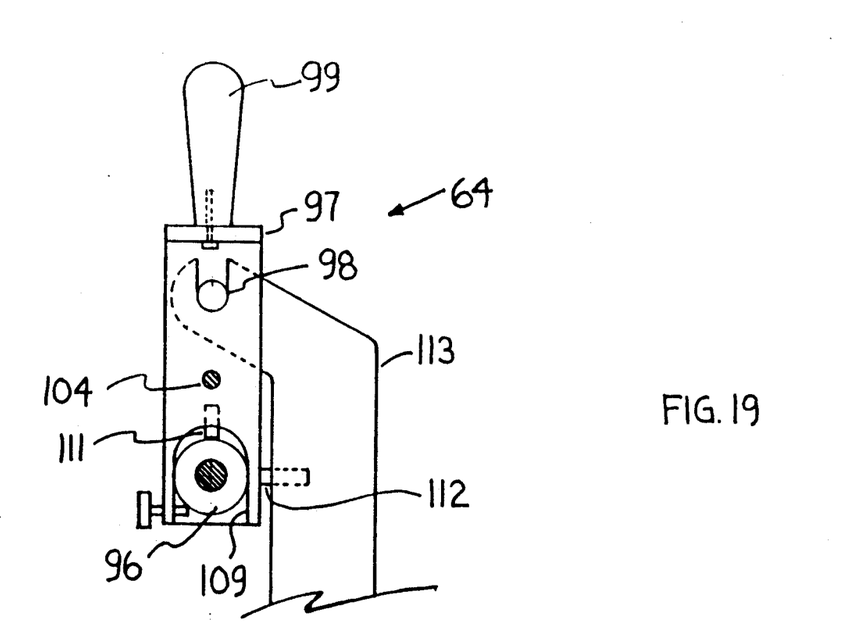
FIG. 19 is a further side elevational view showing the adjustment structure for the rolling structure.

FIGS. 11-14 detail the new and improved belt scraper 26 of this invention. The scraper as seen in FIG. 13 has an outer L-shaped member 81 fastened to an inner L-shaped member 82 by removable fasteners 83. A thin and relatively flexible scraper blade 84 is devised from a thin sheet of an engineering thermoplastic. MYLAR brand plastic works well and a preferred thickness is in the range of 0.010 to 0.020 inches (0.25 to 0.5 mm) thick. The blade is cantilevered up past the rigid L-members 81, 82. A position pin 85 is adjustable fore and aft in a balance slot 86. The outer L-member 81 has plurality of generally dome shaped protrusions or dimples 87 formed in a line across the width of the member 81. A knife edge 88 is then cut or ground on the member 81 and a generally flat separation surface 89 is also cut or ground from the knife edge 88 to the apexes of the dimples 87 which gives a serrated separation edge 90 to separate the cooked and solidified food off of the belts 11 and 60a and the machine 10. The blade 84 may be turned end for end and top for bottom giving four edges to work with before repacement is necessary. Devising a structure to effectively bias the blade 84 against the belt 11 and 60a was difficult but it was discovered that a single fixed scraper support shaft 91 transversely fixed in the frame 29 is all that is necessary. An optional weight 92 may be placed on the tail to give bias of the blade 84 into the belt 11 and 60a the weight of the scraper tail may be sufficient. To install and/or remove the scraper 26, the pin 85 is simply inserted or removed over the scraper shaft 91 in the gap between the scraper shaft 91 and the belt 11, 61. The blade 84 and pin 85 then locate the scraper 26. The scraper 26 then wiggles around on the shaft 91 and attains alignment with the belts 11 and 60a to compliantly and completely scrape the entire width of the belts 11 and 60a .

FIGS. 16-19 show the food roller mechanism 64 in detail. The food roller mechanism 64 has a serrated plastic faced roller 94 rotatably mounted on a shaft 95 journaled in sealed bearings 96. The bearings 96 are mounted in a pivotable arm 97 which is rotatable about a roller fulcrum 98 either manually via a handle 99, or by a power mechanism (not shown). The roller 94 is an elongate device and has an outer diameter that is serrated by convex grooves 100 along the rollers 94 length. The center of the roller 94 has a diametric groove 101 below the diameter of the grooves 100. Within the groove 101 is a peeler 102 which has an upper C-shaped spring section 103 that snaps on and off of a peeler shaft 104 between a pair of spaced apart retainer rings 105. The roller 94 is driven by an elastic belt 106 driven by an output pulley 107 on the drive roller shaft 46 and connected to a roller input pulley 108 on the roller shaft 95. The output pulley 107 is normally twice the diameter of the input pulley 108 to give a surface speed on the roller 94 which exceeds the speed of the belt 61 by about two to one.

The food roller bearings 96 are held in internal bearing pockets 109 by thumbscrews 110. Release these thumbscrews and the bearings 96 and the roller 94 and shaft 95 fall out for cleaning. The vertical position of the food roller 94 is adjusted with upright set screws 111 and the spacing between the food roller 94 and the belt, which is preferably being a small spacing, is adjusted by horizontal set screws 112 in the food roller pillars 113. The roller fulcrum 98 is also mounted in the pillars 113. A unit of cooked food with a filling is shown being rolled up in FIG. 17. This food product could be a crepe, a pig-in-a-blanket, a sour creame roll-up, a omelet, and so forth. Upon completion of roll up of the food product, the food roller 94 is rotated to an elevated position shown in dotted lines (94A) and the rolled up food product is dopped off the belt 61 into the tray 72. When the roller 94 is elevated the elastic belt 106 merely stretches to conform to a necessary longer length.

Figure 20:
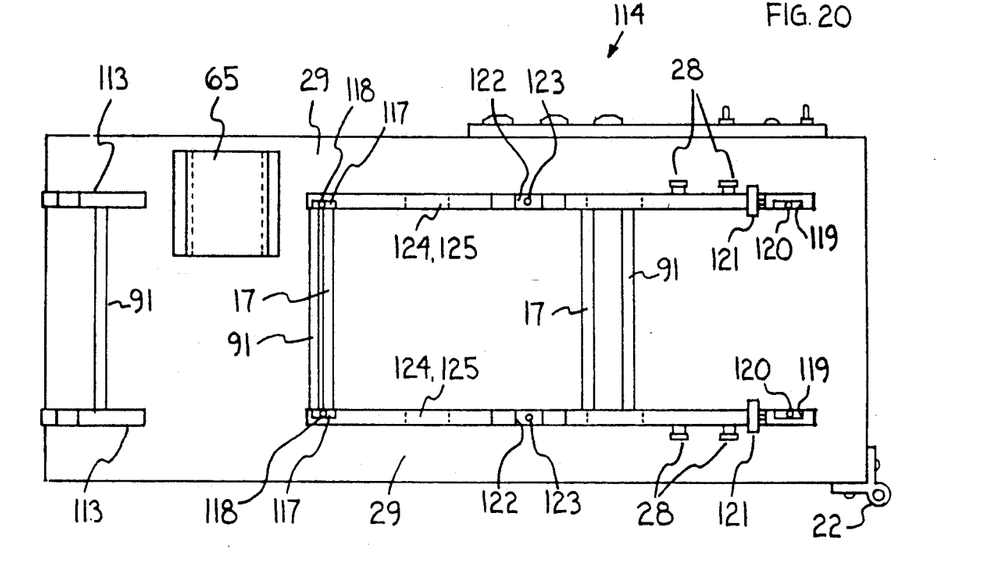
FIG. 20 is a top plan view of the chassis of the machine of FIG. 1.
Figure 21:
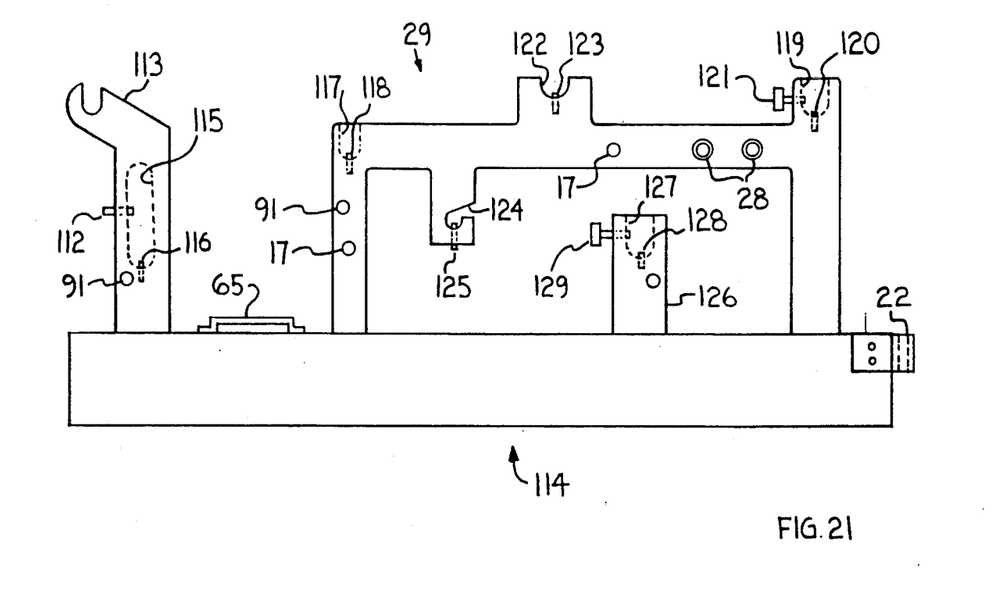
FIG. 21 is a side view of the chassis of FIG. 20.

FIGS. 20 and 21 show the new chassis 114 having the base 23, the frame rails 29, the hopper journal 22, the food roller pillars 113, and the bracket 65 as has been previously described. Note that all moving and food contact componentry is easily removed from the chassis 114. The pillars 113 have pockets 115 for the second belt drive roller bearings 47, upright set screws 116 to adjust the position of the second drive roller 12, and a scraper support shaft 91. Each frame rail 29 has a bearing pocket 117 and vertical adjustment screws 118 for the bearings 47 of the first belt drive roller 12, a second bearing pocket 119 and straight adjustment screw 120 and fore-aft adjustment screw 121 for the bearings 47 of the first belt driver roller 13. Each frame rail 29 further has a scraper support shaft 91, two tensioner shafts 17, and a pair of pins 28 for the loading support 27. Each frame rail 29 further has a first cradle 122 with adjustment screws 123 for the support and positioning of the first hot plate 14, and a second under hung cradle 124 and adjustment screws 125 for support and positioning of the second hot plate 62. Each of the hot plates freely rests in and is free to pivot within its respective cradle 122, 124. Specifically, the hot plates 14, 62 float in the cradles 122, 124 and find a position that conforms to the belts 11, 61. The hot plate fulcrum 60 are centered along the length and movement of inertia of the hot plates 14, 62, so that the hot plates 14, 62 are free of gravitational torque.

Many other advantages, features and additional objects of the present invention will become manifest to those versed in the art upon making reference to the detailed description and accompanying drawings in which the preferred embodiment incorporating the principles of the present invention is set forth and shown by way of illustrative example.

Although other advantages will be found and realized and various modifications be suggested by those versed in the art, be it understood that I embody within the scope of the patent warranted hereon, all such embodiments as reasonably and properly come within the scope of my contribution to the art.

I claim as my invention:

1. A food cooking machine comprising:
   a. a thermally conductive flexible belt;
   b. a hot plate under said belt;
   c. means for moving said belt over said hot plate;
   d. means for placing food upon said belt; and,
   e. a scraper for removing food from said belt, said scraper having
      1. a scraper blade comprising a flat sheet of material having a scraping edge resiliently conformal to the cooking surface of the belt,
      2. a rigid backing on the outside of the blade, said blade being held against said backing,
      3. a plurality of convex generally dome shaped protrusions on the outside of said rigid backing,
      4. a knife edge on said rigid backing adjacent to the scraping edge, and
      5. a serrated separation surface extending from said knife edge to adjacent an apex of each dome shaped protrusion, for separating the cooked food items from the scraper.

2. The food cooking machine of claim 5, in which said protrusions are dimples in said rigid backing.

3. The food cooking machine of claim 1, in which said serrations are separated and spaced from each other.

4. The food cooking machine of claim 1, in which said separation surface extends past said apex of each dome protrusion.

* * * * *